United States Patent
Zhao et al.

(10) Patent No.: US 11,067,505 B2
(45) Date of Patent: Jul. 20, 2021

(54) SMALL ANGLE LASER SCATTEROMETER WITH TEMPERATURE-PRESSURE-CONTROLLABLE SAMPLE CELL AND CHARACTERIZATION METHOD

(71) Applicant: SHANDONG UNIVERSITY, Shandong (CN)

(72) Inventors: Guoqun Zhao, Jinan (CN); Lei Zhang, Jinan (CN); Guilong Wang, Jinan (CN)

(73) Assignee: SHANDONG UNIVERSITY, Jinan (CN)

( * ) Notice: Subject to any disclaimer, the term of this patent is extended or adjusted under 35 U.S.C. 154(b) by 0 days.

(21) Appl. No.: 16/753,398

(22) PCT Filed: Mar. 18, 2019

(86) PCT No.: PCT/CN2019/078542
§ 371 (c)(1),
(2) Date: Apr. 3, 2020

(87) PCT Pub. No.: WO2019/184754
PCT Pub. Date: Oct. 3, 2019

(65) Prior Publication Data
US 2020/0284725 A1    Sep. 10, 2020

(30) Foreign Application Priority Data

Mar. 28, 2018   (CN) .......................... 201810267037.9

(51) Int. Cl.
*G01N 21/51*    (2006.01)
*G01N 21/03*    (2006.01)
*G01N 21/47*    (2006.01)

(52) U.S. Cl.
CPC .......... *G01N 21/51* (2013.01); *G01N 21/0332* (2013.01); *G01N 2021/4707* (2013.01); *G01N 2021/513* (2013.01)

(58) Field of Classification Search
CPC ....... G01N 2021/4707; G01N 21/0332; G01N 21/51; G01N 2021/513; G01N 21/0317; G01N 21/47
(Continued)

(56) References Cited

U.S. PATENT DOCUMENTS 5,381,233 A * 1/1995 Chao .................... G01B 11/065
356/364
2006/0243912 A1* 11/2006 Raymond .......... G01B 11/0616
250/359.1

(Continued)

FOREIGN PATENT DOCUMENTS

CN      2162652 Y    4/1994
CN      1908625 A    2/2007
(Continued)

OTHER PUBLICATIONS

Jun. 19, 2019 International Search Report issued in International Patent Application No. PCT/CN2019/078542.
Jun. 19, 2019 Written Opinion issued in International Patent Application No. PCT/CN2019/078542.

*Primary Examiner* — Tri T Ton
(74) *Attorney, Agent, or Firm* — Oliff PLC

(57) ABSTRACT

A small angle laser scatterometer with a temperature-pressure-controllable sample cell and a characterization method, the scatterometer formed by sequentially arranging a laser source, an adjustable attenuator, a beam expanding lens, a polarizer, the temperature-pressure-controllable sample cell, an analyzer, a transmission-type projection screen and an image acquisition device. The temperature-pressure-controllable sample cell is composed of a visual autoclave, a
(Continued)

temperature control component, a rapid cooling component and a pressure control component. An evolution process of microstructures of polymer materials in specific atmosphere and rapid temperature and pressure changing environments on a scale of 0.5 μm to 10 μm. Researching a condensed state evolution law of the polymer materials in high-pressure environments can provide a process solution for regulating crystallization and phase separation of the polymer materials and new thought for further and deep reveal of a polymer material crystallization mechanism.

12 Claims, 3 Drawing Sheets

(58) Field of Classification Search
USPC .................................. 356/432–448, 244–246
See application file for complete search history.

(56) References Cited

U.S. PATENT DOCUMENTS

2008/0202215 A1    8/2008  Slater et al.
2016/0258810 A1*   9/2016  Van Der Post ..... G03F 7/70516

FOREIGN PATENT DOCUMENTS

| CN | 101298032 A | 11/2008 |
| CN | 202512059 U | 10/2012 |
| CN | 104100257 A | 10/2014 |
| CN | 104614290 A | 5/2015 |
| CN | 104931388 A | 9/2015 |
| CN | 105424734 A | 3/2016 |
| CN | 106198609 A | 12/2016 |
| CN | 108318454 A | 7/2018 |
| CN | 208043654 U | 11/2018 |

* cited by examiner

SMALL ANGLE LASER SCATTEROMETER WITH TEMPERATURE-PRESSURE-CONTROLLABLE SAMPLE CELL AND CHARACTERIZATION METHOD

BACKGROUND

Technical Field

The present invention relates to a small angle laser scatterometer configured to characterize an evolution process of a condensed state structure of polymer materials in specific atmosphere and rapid temperature and pressure changing environments.

Related Art

Research of condensed state structure features, forming conditions of polymer materials and their relationship with material properties has quite important significance for polymer forming processing control, physical modification and material design. The latest research finds that atmosphere pressure in environments is also an important factor affecting a condensed state structure of the polymer materials.

Small angle laser scattering (SALS) is an experimental method developed in the 1960s, can measure microstructures with a structure size range being 0.5 micron to tens of microns by utilizing the Rayleigh scattering principle of visible light. SALS is an important research means for researching phase separation of polymer solutions and polymer blends as well as polymer microstructures.

Tianjin University discloses a patent technology entitled "Small Angle Laser Scatterometer System" (Publication number: CN 93202023.2) in China in 1994. The small angle laser scatterometer system of the patent is composed of a laser device, a neutral filter assembly part, a polarizer part, a sample stage part, a slide glass used to hold the measured polymer material sample, a polarization analyzer, an optical imaging lens assembly part, a CCD camera, a receiving field adjusting assembly part and a prism refraction part. The small angle laser scatterometer system is configured to study the form, structure and orientation of the polymer materials, determine a crystallization form and size and research phase structure and phase separation of a multiphase polymer material system. However, the small angle laser scatterometer system is only suitable for researching microscopic behaviors of the polymer materials in atmospheric pressure environments, and does not realize atmospheric pressure control of a sample.

Institute of Chemistry, Chinese Academy of Sciences discloses a patent technology entitled "Time Resolving Two-dimensional Laser Scattering Apparatus with Small and Large Angles" (Patent number: CN 200510012282.8) in China in 2005. According to the apparatus, a large angle detection system is composed of two large-aperture lenses and a very sensitive area array detector, and continuous scattering signals within a wide angle range can be detected. In the direction of incident light, a detection screen and another detector are installed, and strong scattering signals within a small angle range can be detected. However, the apparatus does not have an atmospheric pressure control function for a sample placing environment and cannot be configured to research condensed state evolution behaviors of the polymer materials in high-pressure atmosphere environments.

Hunan University of Science and Technology discloses a patent technology entitled "Laser Scattering and Raman Spectrum Combination Device" (Patent number: CN 201120526103.3) in China in 2011. According to the laser scattering and Raman spectrum combination device of the patent, 90°, 180° and small angle light scattering light paths are set in a testing light path for laser excitation of a sample. Scattered light enters a spectrograph after passing through an imaging lens and a Rayleigh light filter. The spectrograph scans and records spectrums to obtain a Raman spectrum. Scattered light for exciting the sample at 90°, 180° and a small angle passes through a diaphragm and the imaging lens and then enters the spectrograph. The spectrograph is controlled to scan a laser excitation wavelength position. A slit width is adjusted to only allow scattered light with a wavelength being a laser excitation wavelength to pass through. Thus photon counting measurement and photon-related scattering measurement are performed, and laser scattering and Raman spectrum combination is performed. However, the laser scattering and Raman spectrum combination device does not involve control over temperature and atmospheric pressure of the sample, and is limited in application range.

A granted patent "Rheological In-situ Online Test System Integrating Scattering and Microscopy" (CN201510086324.6) filed by Qingdao University of Science & Technology in 2015, discloses an integrated flat capillary rheological in-situ online test system capable of performing laser scattering and microscopic observation while performing rheological property testing. The rheological in-situ online test system can provide a stable shear flow field and rheological parameters related to macroscopic properties of materials can be provided through a rheological system, and detect and observe the in-situ internal microstructures of polymer materials through an optical technology. However, the rheological in-situ online test system cannot accurately control atmospheric pressure of observed objects and is not suitable for static observation of microstructure evolution of the polymer materials in high-pressure atmosphere environments.

The inventor finds that the systems and methods disclosed in the mentioned patents not only have the problem of an insufficient function of temperature control or pressure control, but also are not suitable for detecting a material evolution process under rapid pressure and temperature change. This is because that the fact that how to prevent a critical opalescence phenomenon occurring in sample placing space is not considered in the design of the systems. The critical opalescence phenomenon is a strong light scattering phenomenon occurring when a substance, subjected to severe density fluctuation near a critical point, is illuminated by light. When pressure and temperature rapidly change, the critical opalescence phenomenon is prone to causing a blank screen in an imaging system and consequently causing loss of a part of images in the material evolution process. What's even more serious is that when a material system with a relatively high speed of structure evolution is observed, the blank screen phenomenon further causes total failure of the whole system.

SUMMARY

In order to solve the problem of an insufficient function of temperature control or pressure control of currently disclosed test systems and methods and to realize detection of a material evolution process under rapid pressure and temperature environment change, the present invention discloses a small angle laser scatterometer with a temperature-pressure-controllable sample cell and a characterization method thereof. The scatterometer can be configured to perform online characterization of the evolution process of microstructures of polymer materials in specific atmosphere and rapid temperature and pressure changing environments, and determine crystallization forms, sizes and the like of the polymer materials, thus providing an important means for studying phase structure and phase separation of a multi-phase polymer material system in high-pressure atmosphere.

To achieve the foregoing objectives, the present invention adopts the following technical solution.

The present invention provides a small angle laser scatterometer with a temperature-pressure-controllable sample cell, including the temperature-pressure-controllable sample cell. A light passing hole is formed in the sample cell. A laser source, an adjustable attenuator, a beam expanding lens and a polarizer are sequentially arranged on one side of the sample cell. An analyzer, a transmission-type projection screen and an image acquisition device are sequentially arranged on another side of the sample cell. After subjected to intensity adjustment through the adjustable attenuator, a light source emitted by the laser source enters the beam expanding lens. The beam expanding lens adjusts a light beam diameter, then an adjusted light beam penetrates through the polarizer and enters the sample cell. Light coming out of the sample cell is projected on the transmission-type projection screen through the analyzer. The image acquisition device acquires images on the transmission-type projection screen. The temperature-pressure-controllable sample cell is composed of a visual autoclave, a temperature control component, a rapid cooling component and a pressure control component. The visual autoclave is configured to place a sample to be observed. The temperature control component is configured to control temperature of the visual autoclave. The rapid cooling component is configured to rapidly cool the visual autoclave. The pressure control component is configured to control pressure of the visual autoclave.

Further, the visual autoclave includes an autoclave body and an autoclave cover. The autoclave body is of a cylindrical structure with an opening on the top. An upper glass window, a breathable gasket and a lower glass window are sequentially pressed in the autoclave body from top to bottom by the autoclave cover. Sample placing space is formed among the upper glass window, the breathable gasket and the lower glass window. Light passing holes with central lines located on the same straight line are formed in a bottom of the autoclave body and the center of the autoclave cover. A light path system of the visual autoclave is composed of the light passing hole in the lower bottom of the autoclave body, the lower glass window, the breathable gasket, the upper glass window and the light passing hole in the center of the autoclave cover. Light can enter from the light passing hole in the center of the lower bottom of the autoclave body, then sequentially passes through the lower glass window, the center of the breathable gasket and the upper glass window and finally is emitted from the light passing hole in the center of the autoclave cover.

Further, a first sealing ring is arranged on a matching surface between the upper glass window and the autoclave cover. The first sealing ring is configured to prevent high-pressure fluid in the autoclave body from flowing out from the light passing hole of the autoclave cover.

And/or, a second sealing ring is arranged on a matching surface between the autoclave body and the autoclave cover. The second sealing ring is configured to prevent the high-pressure fluid in the autoclave body from flowing out from an interface between the autoclave cover and the autoclave body.

And/or, a third sealing ring is arranged on a matching surface between the lower glass window and the autoclave body. The third sealing ring is configured to prevent the high-pressure fluid in the autoclave body from flowing out from the light passing hole in the lower bottom of the autoclave body.

Resistant temperature of the first sealing ring, the second sealing ring and the third sealing ring should be higher than 200° C.

Further, the breathable gasket provides supporting space for the observed sample. Hardness of the breathable gasket is greater than that of the first sealing ring, the second sealing ring and the third sealing ring. The hardness of the breathable gasket is less than that of the first glass window and the second glass window so as to guarantee that the breathable gasket can effectively transmit sealing clamping force. The breathable gasket includes a middle portion and a peripheral portion. The middle portion is of a hollow structure and used as sample placing space. The peripheral portion is provided with ventilation grooves or notches, so that the sample placing space is connected with remaining space in the autoclave. Thickness of the breathable gasket is less than 2 cm, i.e., a distance between opposite surfaces of the upper glass window and the lower glass window is less than 2 cm. Resistant temperature of the breathable gasket should be higher than that of all the sealing rings.

The temperature control component includes a temperature controller, a heating element, a thermocouple and a signal cable. An input end of the temperature controller is connected with the thermocouple to acquire the temperature in the autoclave body, and an output end thereof is connected with the heating element through the signal cable. The temperature controller can output actually-measured temperature values to a computer through a data acquisition card. The computer monitors and records temperature data.

The rapid cooling component includes an autoclave cooling seat, a first stop valve, a liquid pump, a liquid thermostat and a cooling liquid pipeline. The autoclave cooling seat is of a cylindrical structure. The visual autoclave is installed in the autoclave cooling seat. A light passing hole allowing the light source to pass through is formed in a base of the autoclave cooling seat. The light passing hole is coaxial with the light passing hole in the lower bottom of the autoclave body, and the cooling liquid pipeline is distributed in the autoclave cooling seat. The cooling liquid pipeline, the liquid pump and the liquid thermostat form a circulation loop. The first stop valve is arranged on the circulation loop; and a temperature control range of the liquid thermostat is −100° C.-100° C.

The pressure control component includes a fluid source, a plunger pump, a second stop valve, a third stop valve, a drain valve, a pressure sensor and a pipeline. An outlet of the fluid source is connected with an inlet of the plunger pump. An outlet of the plunger pump is sequentially connected with the second stop valve, the pressure sensor and an inlet/outlet of the visual autoclave. The pipeline branch between the pressure sensor and the second stop valve is sequentially connected with the third stop valve and the drain valve. Fluid provided by the fluid source may be water, carbon dioxide, nitrogen, organic solvent and the like. In the state that the second stop valve is opened and the third stop valve is closed, the plunger pump can control the pressure in the visual autoclave in two modes of constant pressure or constant flow. The pressure control range of the plunger pump is 0.1 MPa to 65 MPa. The drain valve can adjust a fluid drain speed. Pressure signals acquired by the pressure sensor are transmitted into a computer through a data acquisition card. The computer monitors and records pressure data.

Further, light transmittance of the sample is not less than 60%, the sample is in the shape of a thin sheet, and a thickness range of the thin sheet is 0.005 μm-500 μm.

The use methods of the present invention are as follows:

(I) Method for Online Observation of a Sample Through Small Angle Laser Scattering in Normal-Pressure Normal-Temperature Environments step (1), making the sample to be observed into a thin sheet;

step (2), placing the second glass window inside the autoclave body, and placing the sample on a surface, close to the center of the autoclave body, of the second glass window;

step (3), turning off power supplies of the pressure control component, the temperature control component and the rapid cooling component in the scatterometer, and keeping in an off state;

step (4), adjusting intensity of the laser source, the light beam diameter, alight path angle, a position of the transmission-type projection screen and the like, rotating the analyzer to obtain an Hv diagram of the observed sample when a grating direction of the polarizer and a grating direction of the analyzer are perpendicular and obtain a Vv diagram of the observed sample when the grating direction of the polarizer and the grating direction of the analyzer are parallel, and setting camera exposure time to prepare to shoot;

step (5), starting the image acquisition device to start shooting or recording, and storing images;

step (6), turning off power supplies of all the components in the scatterometer after the shooting is ended; and step (7), measuring a distance L between the sample and the transmission-type projection screen and a distance d between the brightest point of a scattering spot and the center of a scattering pattern, and performing subsequent result analysis.

(II) Method for Online Observation of a Sample Through Small Angle Laser Scattering in Normal-Pressure Variable-Temperature Environments step (1), making the sample to be observed into a thin sheet;

step (2), sequentially placing the second glass window and the breathable gasket inside the autoclave body, placing the sample into central space of the breathable gasket, then placing the first glass window inside the autoclave body, and finally placing the autoclave cover;

step (3), closing all valves and turning off all power supplies in the pressure control component, and keeping in an off state;

step (4), setting temperature of the liquid thermostat, and keeping the liquid pump in a standby state;

step (5), according to demands, setting a temperature control program including target temperature and a target temperature rising rate in a heating process, target temperature and a target temperature decreasing rate in a cooling process and the like;

step (6), adjusting intensity of the laser source, the light beam diameter, alight path angle, a position of the transmission-type projection screen and the like, rotating the analyzer to obtain an Hv diagram of the observed sample when a grating direction of the polarizer and a grating direction of the analyzer are perpendicular and obtain a Vv diagram of the observed sample when the grating direction of the polarizer and the grating direction of the analyzer are parallel, and setting exposure time of the image acquisition device to prepare to shoot;

step (7), running the temperature control program, and controlling temperature of the sample cell through a cooperation action of the temperature controller and the liquid pump;

step (8), starting the image acquisition device to perform shooting or recording at selected time, and storing images;

step (9), turning off power supplies of all the components in the scatterometer after the shooting is ended; and step (10), measuring a distance L between the sample and the transmission-type projection screen and a distance d between the brightest point of a scattering spot and the center of a scattering pattern, and performing subsequent result analysis.

(III) Method for Online Observation of a Sample Through Small Angle Laser Scattering in Variable-Pressure Normal-Temperature Environments step (1), making the sample to be observed into a thin sheet;

step (2), sequentially placing the third sealing ring, the second glass window and the breathable gasket inside the autoclave body, placing the sample into central space of the breathable gasket, then placing the first glass window inside the autoclave body, installing the first sealing ring and the second sealing ring in a groove of the autoclave cover and a groove in an upper surface of the autoclave body respectively, and connecting the autoclave cover and the autoclave body through bolts and tightly squeezing all the parts;

step (3), opening the second stop valve and the third stop valve, starting the plunger pump, adjusting to a constant-flow mode, injecting specific fluid into the sample cell with a flow rate of 1 to 20 ml/min, and discharging air from the autoclave;

step (4), turning off power supplies of the temperature control component and a cooling control component, and keeping in an off state;

step (5), according to demands, setting a pressure control program of the specific fluid including target pressure and a target pressure increasing rate in a pressure increasing process, target pressure and a target pressure decreasing rate in a pressure decreasing process and the like;

step (6), adjusting intensity of the laser source, the light beam diameter, alight path angle, a position of the transmission-type projection screen and the like, rotating the analyzer to obtain an Hv diagram of the observed sample when a grating direction of the polarizer and a grating direction of the analyzer are perpendicular and obtain a Vv diagram of the observed sample when the grating direction of the polarizer and the grating direction of the analyzer are parallel, and setting exposure time of the image acquisition device to prepare to shoot;

step (7), running the pressure control program, and controlling pressure of the specific fluid in the sample cell through a cooperation action of the plunger pump, the second stop valve and the third stop valve;

step (8), starting the image acquisition device to start shooting or recording at selected time, and storing images;

step (9), turning off power supplies of all the components in the scatterometer after the shooting is ended; and step (10), measuring a distance L between the sample and the transmission-type projection screen and a distance d between the brightest point of a scattering spot and the center of a scattering pattern, and performing subsequent result analysis.

(IV) Method for Online Observation of a Sample Through Small Angle Laser Scattering in Variable-Pressure Variable-Temperature Environments step (1), making the sample to be observed into a thin sheet;

step (2), sequentially placing the third sealing ring, the second glass window and the breathable gasket inside the autoclave body, placing the sample into the central space of the breathable gasket, then placing the first glass window inside the autoclave body, installing the first sealing ring and the second sealing ring in a groove of the autoclave cover and a groove in an upper surface of the autoclave body respectively, and connecting the autoclave cover and the autoclave body through bolts and tightly squeezing all the parts;

step (3), opening the second stop valve and the third stop valve, starting the plunger pump, adjusting to a constant-flow mode, injecting specific fluid into the sample cell with a flow rate of 1 to 20 ml/min, and discharging air in the autoclave;

step (4), setting temperature of the liquid thermostat, and keeping the liquid pump a standby state;

step (5), according to demands, setting a temperature control program including target temperature and a target temperature rising rate in a heating process, target temperature and a target temperature decreasing rate in a cooling process and the like;

step (6), according to demands, setting a pressure control program of the specific fluid including target pressure and a target pressure increasing rate in a pressure increasing process, target pressure and a target pressure decreasing rate in a pressure decreasing process and the like;

step (7), adjusting intensity of the laser source, the light beam diameter, alight path angle, a position of the transmission-type projection screen and the like, rotating the analyzer to obtain an Hv diagram of the observed sample when a grating direction of the polarizer and a grating direction of the analyzer are perpendicular and obtain a Vv diagram of the observed sample when the grating direction of the polarizer and the grating direction of the analyzer are parallel, and setting exposure time of the image acquisition device to prepare to shoot;

step (8), simultaneously running the temperature control program and the pressure control program, controlling temperature of the sample cell through a cooperation action of the temperature controller and the liquid pump, and controlling pressure of the specific fluid in the sample cell through a cooperation action of the plunger pump, the second stop valve and the third stop valve;

step (9), starting the image acquisition device to perform shooting or recording at selected time, and storing images;

step (10), turning off power supplies of all the components in the scatterometer after the shooting is ended; and step (11), measuring a distance L between the sample and the transmission-type projection screen and a distance d between the brightest point of a scattering spot and the center of a scattering pattern, and performing subsequent result analysis.

The present invention has the beneficial effects:

Compared with an existing small angle laser scatterometer, the scatterometer and the method thereof according to the present invention can characterize the evolution process of the microstructures of the polymer materials in specific atmosphere and rapid temperature and pressure changing environments, and provide a novel characterization means for researching a condensed state evolution law of the polymer materials in high-pressure environments, regulating crystallization and phase separation processes of the polymer materials, researching decoupling of cohesive energy and segmental motion capacity in polymer material crystallization theories, and revealing a material crystallization mechanism.

BRIEF DESCRIPTION OF THE DRAWINGS

The accompanying drawings constituting a part of this application are used for providing further understanding for this application. Exemplary embodiments of this application and descriptions thereof are used for explaining this application and do not constitute an improper limitation to this application.

In the diagram, 1 a laser source; 2 an adjustable attenuator; 3 a beam expanding lens; 4 a polarizer; 5 the temperature-pressure-controllable sample cell; 6 an analyzer; 7 a transmission-type projection screen; 8 an image acquisition device; 9 an autoclave body; 10 an autoclave cover; 11 a first glass window; 12 a second glass window; 13 a bolt; 14 a first sealing ring; 15 a second sealing ring; 16 a third sealing ring; 17 a breathable gasket; 18 a temperature controller; 19 a cylindrical heating rod; 20 a thermocouple; 21 a signal cable; 22 sample placing space; 23 a data acquisition card; 24 a computer; 25 an autoclave cooling seat; 26 a first stop valve; 27 a liquid pump; 28 a liquid thermostat; 29 a cooling liquid pipeline; 30 a fluid source; 31 a plunger pump; 32 a second stop valve; 33 a third stop valve; 34 a drain valve; 35 a pressure sensor; and 36 a pipeline.

Figure 2:
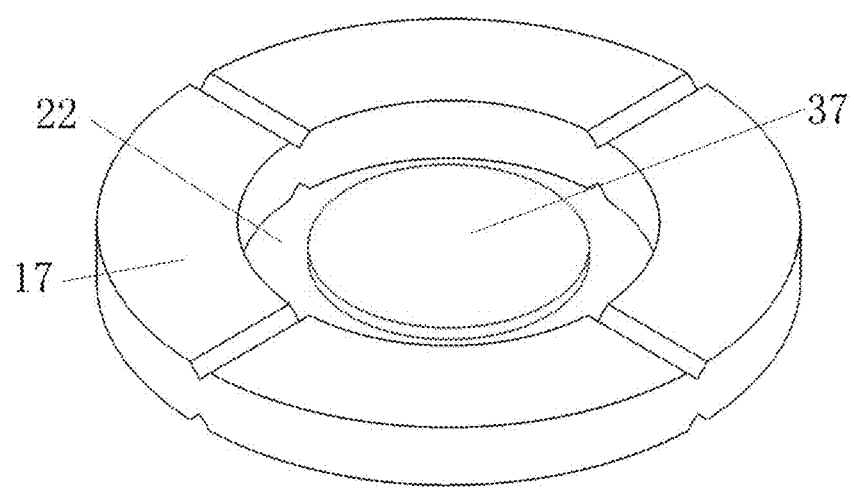

FIG. 2 is a schematic structural diagram of the breathable gasket according to the present invention, where 37 denotes a sheet-shaped sample.

Figure 3:
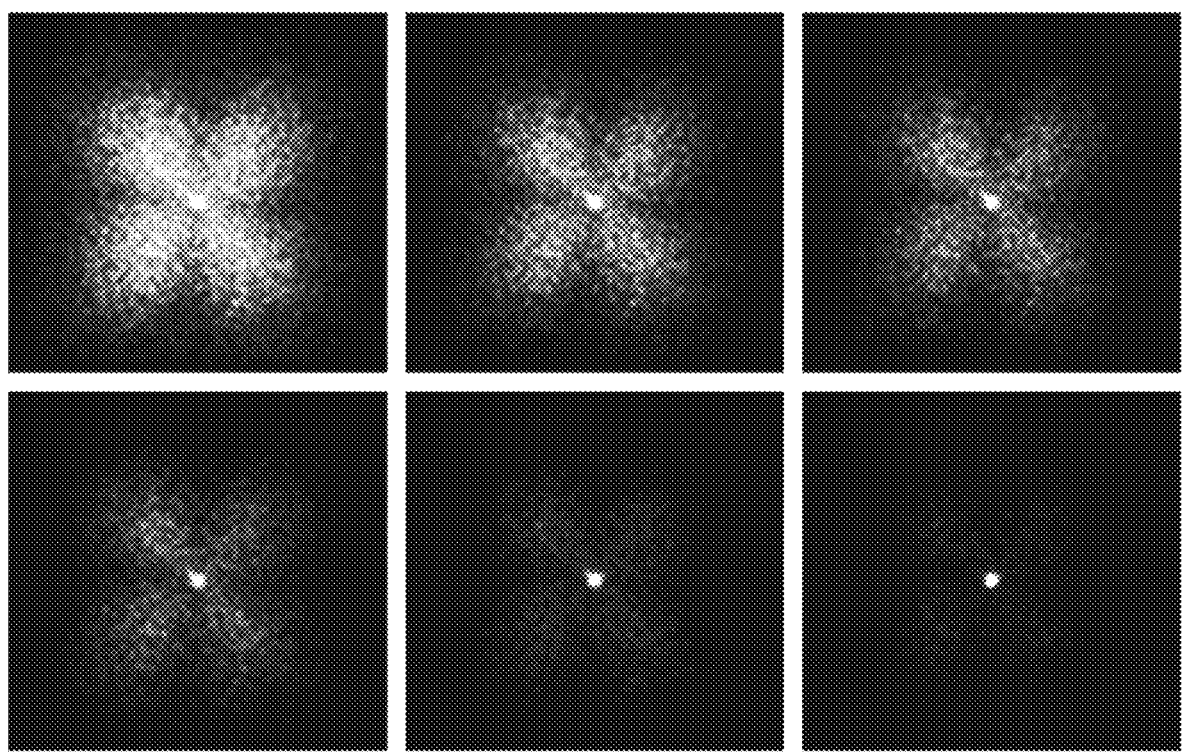

FIG. 3 is small angle laser scattering images of a melting process of PLLA in carbon dioxide observed by the scatterometer according to the present invention.

DETAILED DESCRIPTION

It should be noted that the following detailed descriptions are all exemplary and are intended to provide a further understanding of this application. Unless otherwise specified, all technical and scientific terms used herein have the same meaning as commonly understood by those of ordinary skill in the art to which this application belongs.

It should be noted that terms used herein are only for describing specific implementations and are not intended to limit exemplary implementations according to this application. As used herein, the singular form is intended to include the plural form, unless the context clearly indicates otherwise. In addition, it should further be understood that terms "comprise" and/or "include" used in this specification indicate that there are features, steps, operations, devices, components, and/or combinations thereof.

Rapid cooling of a "rapid cooling component" described in the present invention means that a temperature decreasing rate of a sample cell in a cooling process may maximally reach 6° C./s.

High pressure of an "autoclave" in the present invention means that an internal gas pressure value which can be borne by an autoclave body after sealing may reach 30 MPa. In a pressure relief process, pressure of the autoclave may be relieved to atmospheric pressure, and a pressure relief rate may reach 15 MPa/s.

The present invention is further described below with reference to the accompanying drawings and embodiments.

Figure 1:
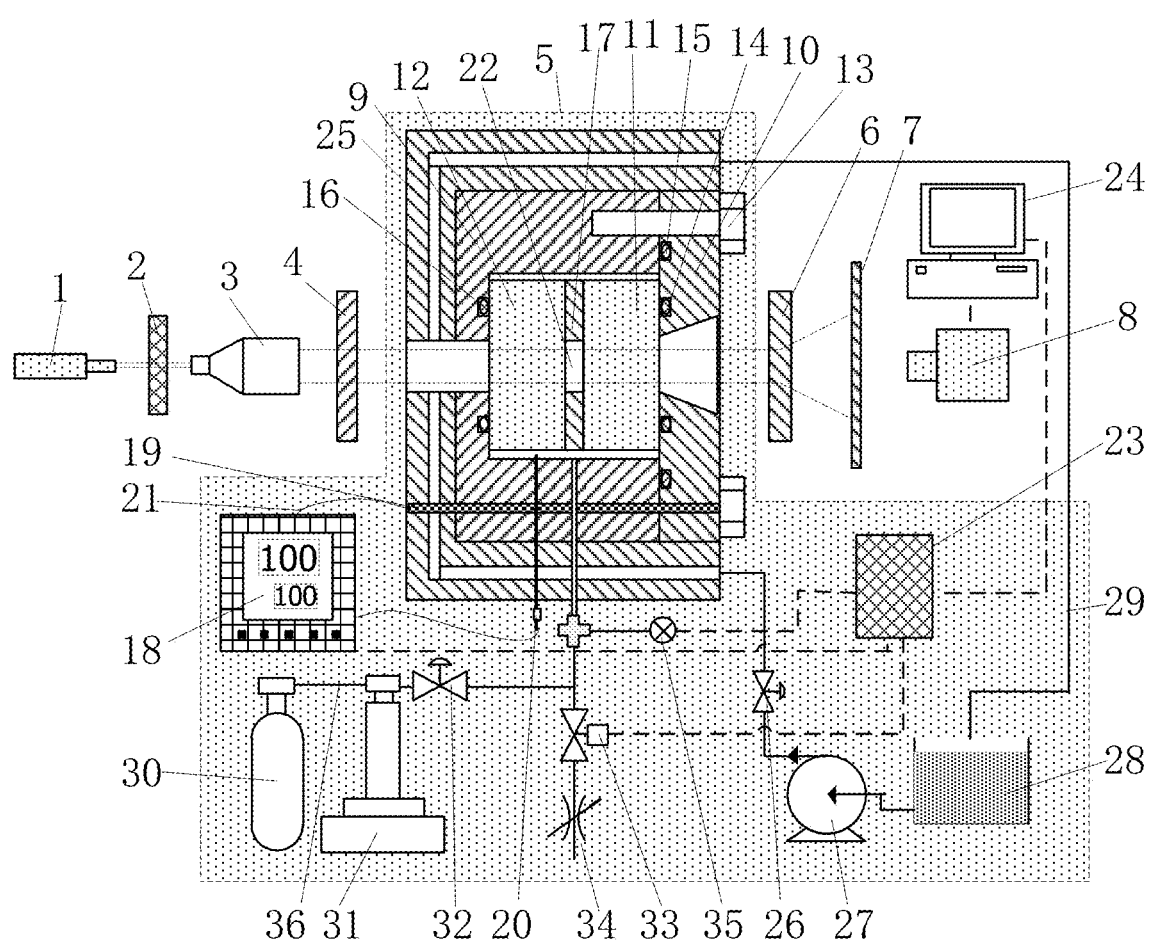
FIG. 1 is a schematic diagram of a small angle laser scatterometer with a temperature-pressure-controllable sample cell according to the present invention.

FIG. 1 shows a small angle laser scatterometer with a temperature-pressure-controllable sample cell according to the present invention. The scatterometer is formed by sequentially arranging a laser source 1, an adjustable attenuator 2, a beam expanding lens 3, a polarizer 4, the temperature-pressure-controllable sample cell 5, an analyzer 6, a transmission-type projection screen 7, and an image acquisition device 8. The temperature-pressure-controllable sample cell 5 is composed of the visual autoclave, a temperature control component, a rapid cooling component and a pressure control component.

The laser source 1 may be a helium-neon gas laser source, with output power being not less than 0.5 mV and a laser wavelength being 632.8 nm. The adjustable attenuator 2 is configured to control laser intensity. A gradually-changing neutral-density filter may be adopted as a lens. The applicative wavelength is 400 to 700 nm. The beam expanding lens 3 is configured to adjust a light beam diameter, and an applicative wavelength range is 400 to 700 nm. The type of the image acquisition device 8 may be, but not limited to, a CMOS or CCD.

The visual autoclave includes an autoclave body 9, an autoclave cover 10, a first glass window 11, a second glass window 12, bolts 13, a first sealing ring 14, a second sealing ring 15, a third sealing ring 16 and a breathable gasket 17. The first sealing ring 14 is installed in a groove in the autoclave cover 10. The third sealing ring 16, the second glass window 12, the breathable gasket 17, the first glass window 11 and the second sealing ring 15 are sequentially installed in the autoclave body 9. The autoclave cover 10 and the autoclave body 9 are connected through the bolts 13 and all the parts are tightly squeezed, so that the visual autoclave is sealed. Light passing holes are formed in a lower bottom of the autoclave body 9 and the center of the autoclave cover 10. Light can enter from the light passing hole in the center of the lower bottom of the autoclave body 9, then sequentially passes through the second glass window 12, the center of the breathable gasket 17 and the first glass window 11 and finally is emitted from the light passing hole in the center of the autoclave cover 10. Space enclosed by the second glass window 12, the breathable gasket 17 and the first glass window 11 is configured to place an observed sample.

Further, the breathable gasket includes a middle portion and a peripheral portion. The middle portion is of a hollow structure and used as sample placing space, and the peripheral portion is provided with ventilation grooves or notches, so that the sample placing space is connected with remaining space in the autoclave. A schematic outline diagram of the breathable gasket is shown in FIG. 2. A way shown in FIG. 2 may be selected for an arrangement way of the ventilation grooves; where a plurality of ventilation grooves are set in the peripheral portion in a radial direction. The number of the ventilation grooves is not limited. The ventilation grooves may be evenly distributed or unevenly distributed. Further preferably, the thickness of the breathable gasket 17 may be designed to be 1 cm, i.e., a distance between opposite surfaces of the first glass window 11 and the second glass window 12 is 1 cm.

Further, the autoclave body 9 and the autoclave cover 10 of the visual autoclave may be made of, but not limited to, stainless steel. The first sealing ring 14, the second sealing ring 15 and the third sealing ring 16 may be made of, but not limited to, fluororubber. The breathable gasket 17 may be made of, but not limited to, polytetrafluoroethylene. The first glass window 11 and the second glass window 12 may be made of, but not limited to, sapphire and high-purity quartz. An autoclave cooling seat 25 may be made of, but not limited to, aluminum alloy.

The temperature control component includes a temperature controller 18, a cylindrical heating rod 19, a thermocouple 20 and a signal cable 21. An input end of the temperature controller 18 is connected with the thermocouple 20 to acquire temperature of internal space of the autoclave body 9, and an output end thereof is connected with the heating rod 19 through the signal cable 21. The temperature controller 18 can output actually-measured temperature values to a computer 24 through a data acquisition card 23. The computer 24 monitors and records temperature data.

The rapid cooling component includes the autoclave cooling seat 25, a first stop valve 26, a liquid pump 27, a liquid thermostat 28 and a cooling liquid pipeline 29. The visual autoclave is installed in the autoclave cooling seat 25. A cooling pipeline is distributed in the autoclave cooling seat. An outlet of the liquid thermostat 28 is connected with an inlet of the liquid pump 27. An outlet of the liquid pump 27 is connected with the first stop valve 26 and an inlet of the autoclave cooling seat 25. An outlet of the autoclave cooling seat 25 is connected with an inlet of the liquid thermostat 28.

Further preferably, a temperature control range of the liquid thermostat 28 in the present embodiment may be −100° C.-100° C.

Specifically, the autoclave cooling seat 25 is of a cylindrical structure. The visual autoclave is installed in the autoclave cooling seat 25. A light passing hole allowing light to pass through is formed in a base of the autoclave cooling seat 25. The light passing hole is coaxial with the light passing hole in the lower bottom of the autoclave body 9.

The pressure control component includes a fluid source 30, a plunger pump 31, a second stop valve 32, a third stop valve 33, a drain valve 34, a pressure sensor 35 and a pipeline 36. An outlet of the fluid source 30 is connected with an inlet of the plunger pump 31. An outlet of the plunger pump 31 is sequentially connected with the second stop valve 32, the pressure sensor 35 and an inlet/outlet of the visual autoclave. A pipeline branch between the pressure sensor 35 and the second stop valve 32 is sequentially connected with the third stop valve 33 and the drain valve 34. Fluid output by the fluid source 30 may be water, carbon dioxide, nitrogen, organic solvent and the like. In the state that the second stop valve 32 is opened and the third stop valve 33 is closed, the plunger pump 31 can control pressure in the visual autoclave in two modes of constant pressure or constant flow.

Further preferably, a pressure control range of the plunger pump 31 may be 0.1 MPa to 65 MPa. If rapid pressure relief is needed, the third stop valve 33 is opened after the second stop valve 32 is closed, and fluid in the autoclave body 9 is finally drained through the drain valve. The drain valve 34 can adjust a fluid drain rate. Pressure signals acquired by the pressure sensor 35 are transmitted into the computer 24 through the data acquisition card 23. The computer 24 monitors and records data.

Further preferably, light transmittance of the sample is not less than 60%. The sample is in the shape of a thin sheet 37. A thickness range of the thin sheet may be 0.005 μm-500 μm.

Detailed description is made through one embodiment below:

Embodiment: crystallization and melting processes of poly(L-lactide) (PLLA) in high-pressure carbon dioxide is characterized by adopting the scatterometer according to the present invention:

Step (1), the PLLA is made into the thin sheet 37 with a thickness being 15 μm.

Step (2), the third sealing ring 16, the second glass window 12 and the breathable gasket 17 are sequentially placed inside the autoclave body 9. The sample 37 is placed into central space 22 of the breathable gasket 17. Then the first glass window 11 is placed on an upper surface of the breathable gasket 17. The first sealing ring 14 and the second sealing ring 15 are respectively installed in the groove of the autoclave cover 10 and a groove in an upper surface of the autoclave body 9. The autoclave cover 10 and the autoclave body 9 are connected through the bolts 13 and all the parts are tightly squeezed.

Step (3), the second stop valve 32 and the third stop valve 33 are opened. The plunger pump 31 is started, and is adjusted to a constant-flow mode. Carbon dioxide is injected into the sample cell with a flow rate of 1 to 20 ml/min. Air in the autoclave is discharged.

Step (4), the temperature controller 18 is turned on. The sample cell is heated to a melting point of PLLA to enable the PLLA to be in a molten state.

Step (5), the third stop valve 33 is closed. The plunger pump 31 is adjusted to a constant-pressure mode. Carbon dioxide continues to be injected into the sample cell till a set pressure value is reached.

Step (6), when temperature and pressure of the sample cell are stabilized at set values, timing of 30 min is started.

Step (7), in a timing process, intensity of the laser source 1, the light beam diameter, alight path angle and a position of the transmission-type projection screen are adjusted. The analyzer 6 is rotated to enable a grating direction of the polarizer and a grating direction of the analyzer to be perpendicular so as to obtain an Hv diagram of the observed sample. Exposure time of the image acquisition device 8 is set to prepare to shoot.

Step (8), when timing is ended, a set value of the temperature controller 18 is adjusted to a PLLA crystallization temperature. The first stop valve 26 is opened and the liquid pump 27 is started simultaneously. The visual autoclave is rapidly cooled to the PLLA crystallization temperature with low-temperature cooling liquid.

Step (9), when the crystallization temperature is reached, timing is started. Shooting and storing are started. The shot images are as shown in FIG. 3.

Step (10), after crystallization is finished, the temperature controller 18 is turned off. The plunger pump 31 is shut down. The image acquisition device 8 is turned off.

Step (11), the first stop valve 26 is opened. The liquid pump 27 is started. The sample cell is cooled to room temperature.

Step (12), a distance L between the sample and the transmission-type projection screen and a distance d between the brightest point of a scattering spot and the center of a scattering pattern are measured, and an average radius of spherulites is obtained according to an existing spherulite calculating formula.

The specific implementations of the present invention are described above with reference to the accompanying drawings, but are not intended to limit the protection scope of the present invention. Those skilled in the art should understand that various modifications or deformations may be made without creative efforts based on the technical solutions of the present invention, and such modifications or deformations shall fall within the protection scope of the present invention.

What is claimed is:

1. A small angle laser scatterometer, comprising:
   a temperature-pressure-controllable sample cell having:
      a visual autoclave configured to place a sample to be observed, the visual autoclave having:
         an autoclave body of a cylindrical structure with an opening on the top;
         a sample placing space formed by an upper glass window, a breathable gasket, and a lower glass window;
         an autoclave cover that sequentially presses the upper glass window, the breathable gasket, and the lower glass window in the autoclave body from top to bottom;
         a light passing hole located in a bottom of the autoclave body;
         a light passing hole located in a center of the autoclave cover, the light passing holes having central lines on a same straight line;
         a visual autoclave light path system composed of the light passing hole in the autoclave body, the lower glass window, the breathable gasket, the upper glass window, and the light passing hole in the autoclave cover;
      a temperature control component configured to control temperature of the visual autoclave;
      a rapid cooling component configured to rapidly cool the visual autoclave;
      a pressure control component configured to control pressure of the visual autoclave;
      sequentially arranged on one side of the sample cell:
         a laser source;
         an adjustable attenuator;
         a beam expanding lens; and
         a polarizer; and
      sequentially arranged on another side of the sample cell:
         an analyzer;
         a transmission-type projection screen; and
         an image acquisition device,
   wherein the small angle laser scatterometer is configured such that after subjected to intensity adjustment through the adjustable attenuator, a light emitted by the laser source enters the beam expanding lens, the beam expanding lens adjusts a light beam diameter, then an adjusted light beam penetrates through the polarizer and enters the sample cell, light coming out of the sample cell is projected on the transmission-type projection screen through the analyzer, and the image acquisition device acquires images on the transmission-type projection screen, and light enters from the light passing hole in the center of the lower bottom of the autoclave body, then sequentially passes through the lower glass window, the center of the breathable gasket and the upper glass window and finally is emitted from the light passing hole in the center of the autoclave cover.

2. The small angle laser scatterometer according to claim 1, wherein a first sealing ring is arranged on a matching surface between the upper glass window and the autoclave cover, and configured to prevent high-pressure fluid in the autoclave body from flowing out from the light passing hole in the autoclave cover; and/or
- a second sealing ring is arranged on a matching surface between the autoclave body and the autoclave cover, and configured to prevent the high-pressure fluid in the autoclave body from flowing out from an interface between the autoclave cover and the autoclave body; and/or
- a third sealing ring is arranged on a matching surface between the lower glass window and the autoclave body, and configured to prevent the high-pressure fluid in the autoclave body from flowing out from the light passing hole in the lower bottom of the autoclave body.

3. The small angle laser scatterometer according to claim 1, wherein the breathable gasket provides supporting space for the observed sample, and hardness of the breathable gasket is greater than that of the first sealing ring, the second sealing ring and the third sealing ring and less than that of a first glass window and a second glass window;
- the breathable gasket comprises a middle portion and a peripheral portion, the middle portion is of a hollow structure and used as the sample placing space, and the peripheral portion is provided with ventilation grooves or notches, so that the sample placing space is connected with remaining space in the autoclave.

4. The small angle laser scatterometer according to claim 1, wherein a thickness of the breathable gasket is less than 2 cm, i.e., a distance between opposite surfaces of the upper glass window and the lower glass window is less than 2 cm.

5. The small angle laser scatterometer according to claim 1, wherein resistant temperature of the breathable gasket should be higher than that of all the sealing rings.

6. The small angle laser scatterometer according to claim 1, wherein the temperature control component comprises a temperature controller, a heating element, a thermocouple and a signal cable, wherein:
- an input end of the temperature controller is connected with the thermocouple to acquire the temperature in the autoclave body, and an output end thereof is connected with the heating element through the signal cable; and the temperature controller can output actually-measured temperature values to a computer through a data acquisition card, and the computer monitors and records temperature data.

7. The small angle laser scatterometer according to claim 1, wherein the rapid cooling component comprises an autoclave cooling seat, a first stop valve, a liquid pump, a liquid thermostat and a cooling liquid pipeline;
- the autoclave cooling seat is of a cylindrical structure, the visual autoclave is installed in the autoclave cooling seat, and a light passing hole allowing the light to pass through is in a base of the autoclave cooling seat; the light passing hole is coaxial with the light passing hole in the lower bottom of the autoclave body, and the cooling liquid pipeline is distributed in the autoclave cooling seat; and the cooling liquid pipeline, the liquid pump and the liquid thermostat form a circulation loop, and the first stop valve is arranged on the circulation loop.

8. The small angle laser scatterometer according to claim 1, wherein the pressure control component comprises a fluid source, a plunger pump, a second stop valve, a third stop valve, a drain valve, a pressure sensor and a pipeline; and
- an outlet of the fluid source is connected with an inlet of the plunger pump, an outlet of the plunger pump is sequentially connected with the second stop valve, the pressure sensor and an inlet/outlet of the visual autoclave, and a pipeline branch between the pressure sensor and the second stop valve is sequentially connected with the third stop valve and the drain valve.

9. A method for observing a sample in variable-pressure normal-temperature environments by utilizing the small angle laser scatterometer according to claim 1, comprising:
- step I, making the sample to be observed into a thin sheet;
- step II, sequentially placing the third sealing ring, the second glass window and the breathable gasket inside the autoclave body, placing the sample into central space of the breathable gasket, then placing the first glass window inside the autoclave body, installing the first sealing ring and the second sealing ring in a groove of the autoclave cover and a groove in an upper surface of the autoclave body respectively, and connecting the autoclave cover and the autoclave body through bolts and tightly extruding all the parts;
- step III, opening the second stop valve and the third stop valve, starting the plunger pump, adjusting to a constant-flow mode, injecting specific fluid into the sample cell with a flow rate of 1 to 20 ml/min, and discharging air in the autoclave;
- step IV, turning off power supplies of the temperature control component and a cooling control component, and keeping in an off state;
- step V, according to demands, setting a pressure control program of the specific fluid comprising target pressure and a target pressure increasing rate in a pressure increasing process, target pressure and a target pressure decreasing rate in a pressure decreasing process and the like;
- step VI, adjusting intensity of the laser source, the light beam diameter, a light path angle, a position of the transmission-type projection screen and the like, rotating the analyzer to obtain an Hv diagram of the observed sample when a grating direction of the polarizer and a grating direction of the analyzer are perpendicular and obtain a Vv diagram of the observed sample when the grating direction of the polarizer and the grating direction of the analyzer are parallel, and setting exposure time of the image acquisition device to prepare to shoot;
- step VII, running the pressure control program, and controlling pressure of the specific fluid in the sample cell through a cooperation action of the plunger pump, the second stop valve and the third stop valve;
- step VIII, starting the image acquisition device to start shooting or recording at selected time, and storing images;
- step IX, turning off power supplies of all the components in the scatterometer after the shooting is ended; and
- step X, measuring a distance L between the sample and the transmission-type projection screen and a distance d between the brightest point of a scattering spot and the center of a scattering pattern, and performing subsequent result analysis.

10. A method for observing a sample in variable-pressure variable-temperature environments by utilizing the small angle laser scatterometer according to claim 1, comprising:

step I, making the sample to be observed into a thin sheet;
step II, sequentially placing the third sealing ring, the second glass window and the breathable gasket inside the autoclave body, placing the sample into the central space of the breathable gasket, then placing the first glass window inside the autoclave body, installing the first sealing ring and the second sealing ring in a groove of the autoclave cover and a groove in an upper surface of the autoclave body respectively, and connecting the autoclave cover and the autoclave body through bolts and tightly extruding all the parts;
step III, opening the second stop valve and the third stop valve, starting the plunger pump, adjusting to a constant-flow mode, injecting specific fluid into the sample cell with a flow rate of 1 to 20 ml/min, and discharging air in the autoclave;
step IV, setting temperature of the liquid thermostat, and keeping the liquid pump in a standby state;
step V, according to demands, setting a temperature control program comprising target temperature and a target temperature rising rate in a heating process, target temperature and a target temperature decreasing rate in a cooling process and the like;
step VI, according to demands, setting a pressure control program of the specific fluid comprising target pressure and a target pressure increasing rate in a pressure increasing process, target pressure and a target pressure decreasing rate in a pressure decreasing process and the like;
step VII, adjusting intensity of the laser source, the light beam diameter, a light path angle, a position of the transmission-type projection screen and the like, rotating the analyzer to obtain an Hv diagram of the observed sample when a grating direction of the polarizer and a grating direction of the analyzer are perpendicular and obtain a Vv diagram of the observed sample when the grating direction of the polarizer and the grating direction of the analyzer are parallel, and setting exposure time of the image acquisition device to prepare to shoot;
step VIII, simultaneously running the temperature control program and the pressure control program, controlling temperature of the sample cell through a cooperation action of the temperature controller and the liquid pump, and controlling pressure of the specific fluid in the sample cell through a cooperation action of the plunger pump, the second stop valve and the third stop valve;
step IX, starting the image acquisition device to perform shooting or recording at selected time, and storing images;
step X, turning off power supplies of all the components in the scatterometer after the shooting is ended; and
step XI, measuring a distance L between the sample and the transmission-type projection screen and a distance d between the brightest point of a scattering spot and the center of a scattering pattern, and performing subsequent result analysis.

11. A method for observing a sample in normal-temperature normal-pressure environments by utilizing the small angle laser scatterometer according to claim 1, comprising:
step I, making the sample to be observed into a thin sheet;
step II, placing the second glass window inside the autoclave body, and placing the sample on a surface, close to the center of the autoclave body, of the second glass window;
step III, turning off power supplies of the pressure control component, the temperature control component and the rapid cooling component in the scatterometer, and keeping in an off state;
step IV, adjusting intensity of the laser source, the light beam diameter, a light path angle, a position of the transmission-type projection screen and the like, rotating the analyzer to obtain an Hv diagram of the observed sample when a grating direction of the polarizer and a grating direction of the analyzer are perpendicular and obtain a Vv diagram of the observed sample when the grating direction of the polarizer and the grating direction of the analyzer are parallel, and setting camera exposure time to prepare to shoot;
step V, starting the image acquisition device to start shooting or recording, and storing images;
step VI, turning off power supplies of all the components in the scatterometer after the shooting is ended; and
step VII, measuring a distance L between the sample and the transmission-type projection screen and a distance d between the brightest point of a scattering spot and the center of a scattering pattern, and performing subsequent result analysis.

12. A method for observing a sample in normal-pressure variable-temperature environments by utilizing the small angle laser scatterometer according to claim 1, wherein the method comprises the following specific steps:
step I, making the sample to be observed into a thin sheet;
step II, sequentially placing the second glass window and the breathable gasket inside the autoclave body, placing the sample into central space of the breathable gasket, then placing the first glass window inside the autoclave body, and finally placing the autoclave cover;
step III, closing all valves and turning off all power supplies in the pressure control component, and keeping in an off state;
step IV, setting temperature of the liquid thermostat, and keeping the liquid pump in a standby state;
step V, according to demands, setting a temperature control program comprising target temperature and a target temperature rising rate in a heating process, target temperature and a target temperature decreasing rate in a cooling process and the like;
step VI, adjusting intensity of the laser source, the light beam diameter, a light path angle, a position of the transmission-type projection screen and the like, rotating the analyzer to obtain an Hv diagram of the observed sample when a grating direction of the polarizer and a grating direction of the analyzer are perpendicular and obtain a Vv diagram of the observed sample when the grating direction of the polarizer and the grating direction of the analyzer are parallel, and setting exposure time of the image acquisition device to prepare to shoot;
step VII, running the temperature control program, and controlling temperature of the sample cell through a cooperation action of the temperature controller and the liquid pump;
step VIII, starting the image acquisition device to perform shooting or recording at selected time, and storing images;
step IX, turning off power supplies of all the components in the scatterometer after the shooting is ended; and
step X, measuring a distance L between the sample and the transmission-type projection screen and a distance d between the brightest point of a scattering spot and the center of a scattering pattern, and performing subsequent result analysis.

* * * * *